United States Patent [19]

Hansen

[11] 4,255,946
[45] Mar. 17, 1981

[54] TORQUE OVERLOAD SENSING DEVICE

[76] Inventor: Quinten A. Hansen, Hwy. 38, Franksville, Wis. 53126

[21] Appl. No.: 25,360

[22] Filed: Mar. 30, 1979

[51] Int. Cl.³ .......................... F16D 3/16; F16D 7/00; F16D 43/20
[52] U.S. Cl. ...................................... 64/29; 192/56 R
[58] Field of Search ............... 64/29, 30 A; 192/56 R, 192/110 B, 150

[56] References Cited

U.S. PATENT DOCUMENTS

| | | | |
|---|---|---|---|
| 954,774 | 4/1910 | Beard | 64/29 |
| 2,775,327 | 12/1956 | Gearhart | 192/56 R |
| 3,063,263 | 11/1962 | Bobst et al. | 64/29 |
| 3,127,969 | 4/1964 | Hansen | 192/110 B |
| 3,203,523 | 8/1965 | Gilder et al. | 192/56 R |
| 3,252,303 | 5/1966 | Weasler et al. | 64/29 |
| 3,491,839 | 1/1970 | McIntire | 64/29 X |
| 3,722,644 | 3/1973 | Steinhagen | 192/56 R |
| 3,774,738 | 11/1973 | Steinhagen | 192/56 R |
| 3,835,973 | 7/1975 | Braggins et al. | 192/56 R |
| 3,893,553 | 7/1975 | Hansen | 192/56 R |
| 4,071,092 | 1/1978 | Wallace | 192/150 |
| 4,122,928 | 10/1978 | Smith | 192/56 R |
| 4,142,616 | 3/1979 | Dekoninck | 64/29 X |
| 4,174,621 | 11/1979 | Woltjen | 192/56 R |

Primary Examiner—Henry K. Artis
Attorney, Agent, or Firm—James E. Nilles

[57] ABSTRACT

A rotary drive device for transmitting power and which includes two parts that rotate together. When a predetermined torque is encountered, two parts move slightly relative to one another and immediately cause actuation of switch means which in turn actuates a light, an alarm, or other means to cut off power or otherwise stop the device, until overload conditions are overcome. The relative rotation between the two parts of the device occurs quickly and with a snap action so that upon reaching an overload torque condition, a signal is immediately given without delay and without "hunting" of the device or other hesitation. The device furthermore has spring means for loading an axially shiftable switching plate and which springs and plate are also used to transmit axial force on a ball and detent means between the two parts. The device utilizes the same spring means for resiliently loading the switch plate and for setting the maximum driving torque. The resulting device is instantaneous in action when overload torque conditions are encountered, has a minimum number of parts for the functions performed, is economical to manufacture and simple and foolproof in operation.

4 Claims, 5 Drawing Figures

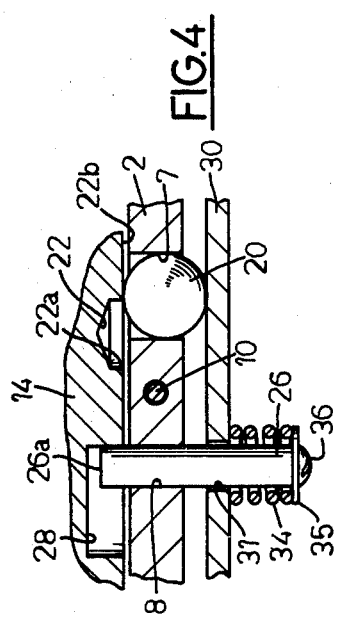
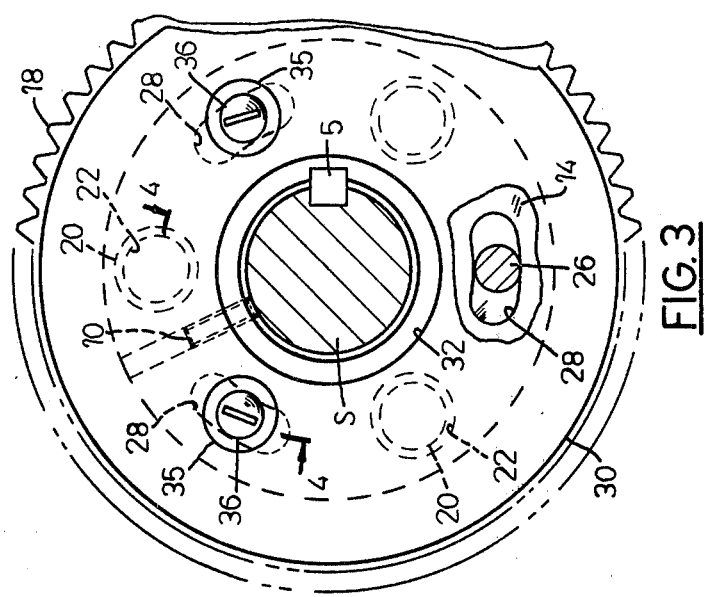
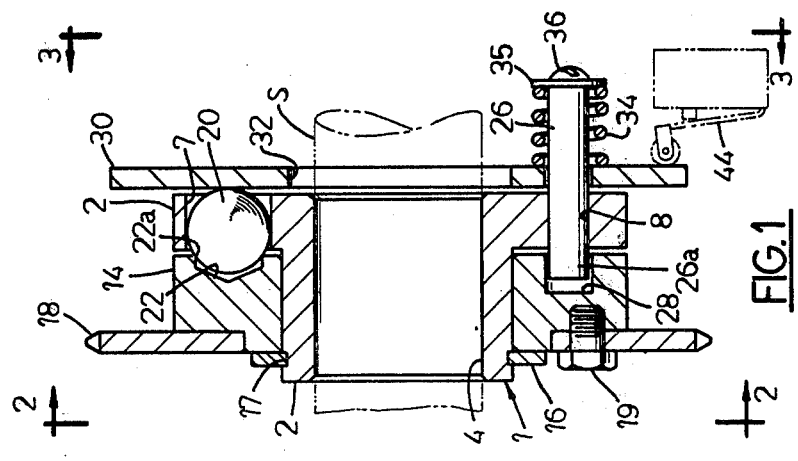
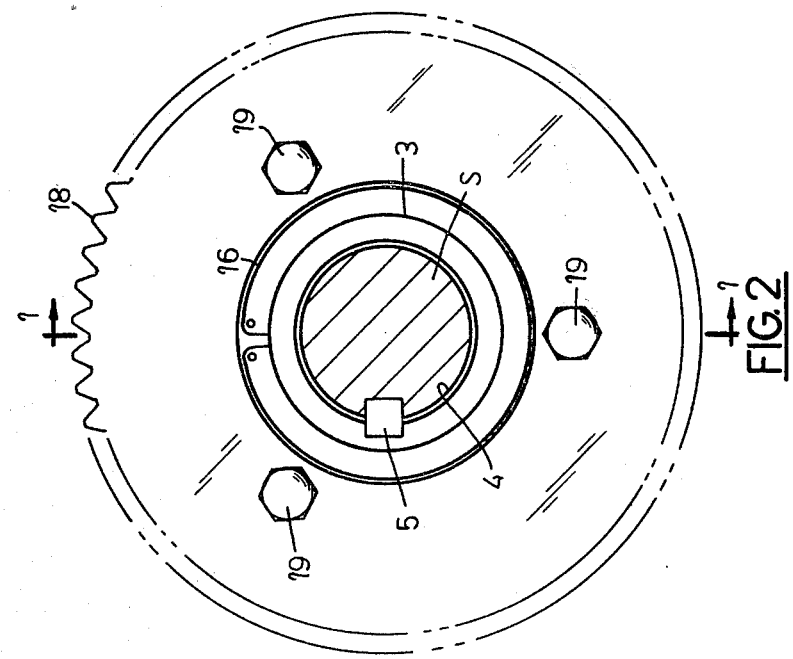

TORQUE OVERLOAD SENSING DEVICE

BACKGROUND OF THE INVENTION

Prior art devices of this general character have been proposed, some of which become completely disengaged and cease their driving function, as well as signalling the overload condition. An example of such a prior art device is shown in the U.S. Pat. No. 2,144,769 issued Jan. 24, 1939 and entitled "Overload Release Structure". That device is furthermore extremely complicated and operates with a cushioning or gentle action when tripping on overload is encountered, which results in an intended no shock load condition on the machine it is driving. The resulting structure however results in a time lag in giving the overload signal which can be detrimental to the machine. That device may also result in "hunting" between the parts before the actual device is tripped and the overload signal transmitted.

Another example of a prior art device of this general character is shown in my U.S. Pat. No. 3,893,553 issued July 8, 1975 and entitled "Overload Release Clutch". That clutch is uni-directional in function and the switch plate is spring-loaded, but those springs do not function to set the maximum torque condition of the drive unit.

SUMMARY OF THE PRESENT INVENTION

The present invention provides a torque overload sensing device which is bi-directional in its functions and will continue to furnish driving power between the parts even though an overload condition is signalled; an additional aspect of the invention however includes means for shutting the device off completely until the overload conditions are rectified. The overload sensing device provided by the present invention utilizes springs for resiliently loading its switch plate and which springs are also used to transmit pressure on the releasable parts to thereby set the maximum torque driving conditions prior to the overload signal being given. The switch plate provided by the present invention transmits full spring pressure to a ball and detent means between the relatively rotatable parts. The shape of the detent and its action with the corresponding ball is such that once the overload condition is reached, the device immediately and instantaneously is actuated to send the overload signal, all without hesitation, delay or an interim period of "hunting". As a result, the torque sensing device of the present invention transmits the overload signal immediately and positively when such overload conditions are reached.

These and other objects and advantages of the present invention will appear hereinafter as this disclosure progresses, reference being had to the accompanying drawings.

BRIEF DESCRIPTION OF THE DRAWINGS

FIG. 1 is a transverse, cross sectional view through an overload sensing device made in accordance with the present invention;

FIG. 2 is a transverse side elevational view taken generally from the line 2—2 in FIG. 1;

FIG. 3 is a transverse elevational view of the device taken generally from the line 3—3 in FIG. 1, certain parts being shown as broken away or in section for the sake of clarity;

FIG. 4 is an enlarged, fragmentary view in section, and taken generally along the line 4—4 in FIG. 3.

DESCRIPTION OF A PREFERRED EMBODIMENT

Figure 5:
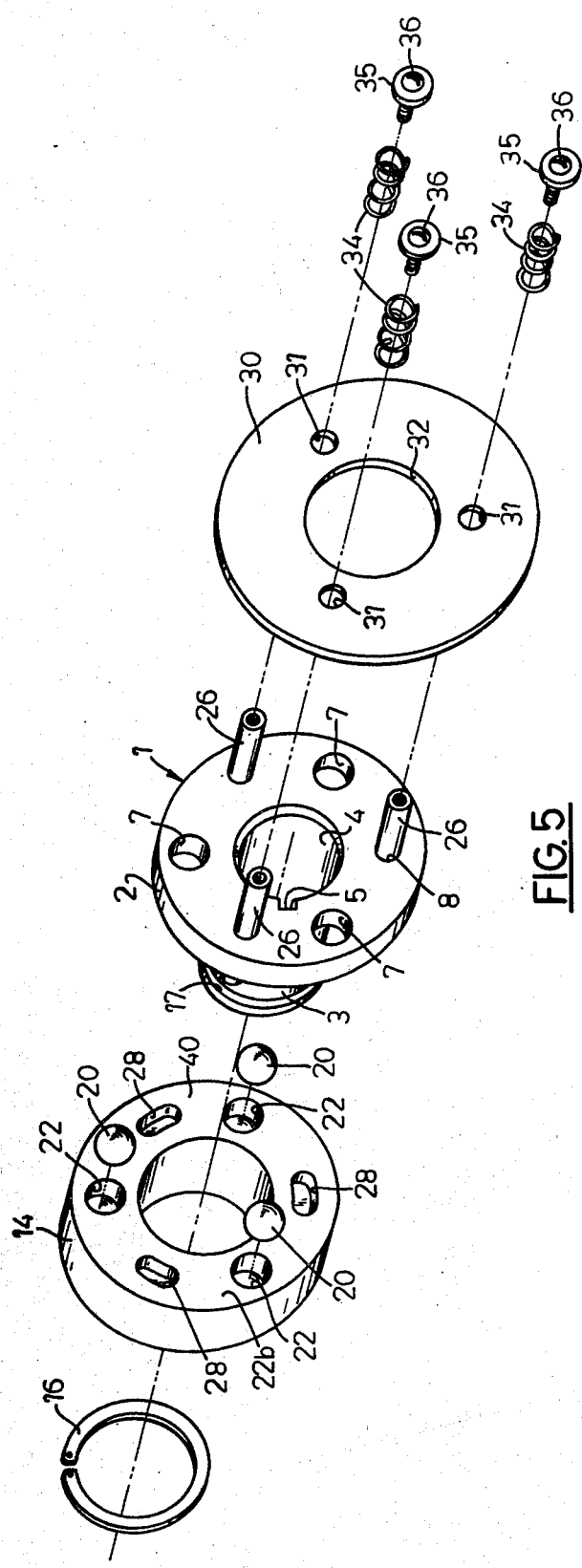
FIG. 5 is an exploded, perspective view of the parts of the device.

The device provided by the present invention transmits power from a source to a machine or the like and it is important when an overload condition is reached that a signal is given to the operator, either in the form of a flashing light, a sounding alarm or other warning means. The invention permits, if desired, the power to be continually transmitted even though the device has been actuated to send an overload signal. This feature is important in that when the device is used, for example on a hoist mechanism it is undesirable to disconnect the device and permit falling of the load, even though an overload condition is reached. Under those circumstances it is important that the overload condition be called to the attention of the operator, but that the device continues to function in hoisting or holding the load. Under some circumstances it may be possible to permit the power to be interrupted when the overload condition is reached and the present invention has additional means for sending an electrical signal or other signal to means for cutting off the power to the device.

In either of the above two situations, the device of the present invention acts to immediately convey a signal for overload conditions without delay, with a quick snap action, and without "hunting" or indecision of the device prior to such signal.

The device of the present invention is shown as mounted on a shaft S and includes a body 1 having a radially extending flange portion 2 and an axially extending hub portion 3. A large central opening 4 permits the insertion of the shaft S and the body is fixed to the shaft by means of a key and key slot means shown generally at 5 between the shaft and the body. The body includes a plurality, in this case three, of holes 7 which extend axially through the flange of the body and also includes other circumferentially spaced smaller holes 8 also extending axially through the flange 2 of the body. Furthermore a set screw 10 is threadably engaged in the body and its inner point engages the shaft periphery when the screw 10 is tightened.

The device also includes a rotor 14 which is mounted on the periphery of the axially extending hub 3 of the body and is held captive thereon by a snap or retaining ring 16 which is engaged in the known manner in a groove 17 at the end of the hub 3. It should be noted that the rotor can rotate slightly on the hub as will appear later.

A driving or driven member such as a sprocket 18 is rigidly secured by cap screws 19 to the rotor for rotation therewith. Power can be transmitted to the device either through the shaft S and taken from the sprocket 18 or conversely, power can be transmitted to the device through the sprocket 18 and taken through the shaft S. Steel balls 20 are located in the holes 7 of the body and extend into detents 22 formed in the rotor, each detent 22 being alignable with a hole 7 of the body. It will be noted that the detent 22 is of such depth that its sharp corners 22a adjacent the transverse surface 22b of the rotor are engaged by the ball 20 and the ball does not bottom in the detents.

A stud 26 is press-fit into each hole 8 of the body flange 2 and extend outwardly in either direction therefrom. Thus the studs are rigidly fixed in the body and cannot shift relative thereto. The inner end of the studs 26a are engaged in arcuate recesses or slots 28 of the rotor and under normal driving conditions are centered in the slots and form no driving connection therewith. In other words, the slots may be approximately of 15 degree arcuate length and the end of the studs 26 are normally located in the center of their respective slots 28. Mounted at the other or outer ends of the studs for axial sliding thereon is a switch plate 30 having circumferentially spaced holes 31 therein, in which the studs are are mounted. Sufficient clearance is provided between the diameter of the studs and the holes 31 to permit the plate to axially slide on the studs within limits. The plate has a large central opening 32 through which the shaft S extends.

It will be noted that the switch plate 30 bears directly against the force transmitting balls 20 and springs 34 mounted on the outer ends of the studs bear against the switch plate and also against a washer 35 held on the end of the studs by screws 36. Thus the springs 34 are pre-compressed to a desired amount and are held captive on the studs, urging the spring plate against the balls and consequently urging the balls into their detents with a predetermined amount of pressure.

Under normal operating conditions, that is conditions of torque under a predetermined amount, the driving force is transmitted between the body and the rotor by means of the balls 20. Thus the springs act to resiliently hold the switch plate in position and also act to transmit the predetermined pressure to the balls to result in a predetermined amount of torque to be transmitted by the device.

When an overload condition is reached, the balls are forced out of their detents and against the compressive action of the spring 34 and this releasing action of the balls is instantaneous, without hesitation and with a snap action with no cushioning or hesitation. This is possible because the balls are carried by the sharp peripheral corner of the detents and once the balls commence rolling out of the holes, the angular force relationship changes dramatically and the balls are completely released from the detents and ride on the transverse surface 22b of the rotor, as shown in FIG. 4, which is the signal giving position.

Even though this slight amount of relative rotation occurs between the rotor and body to cause the balls to quickly be withdrawn from the detents, power is still being transmitted through the body and rotor by means of the studs 26 which have also rotated slightly relative to the rotor to a point where the studs bear against one end or the other of the arcuate slots 28 depending on the directions of relative rotation. Therefore, in either direction of rotation, when the imposed torque exceeds the torque transmitting capability of the spring-loaded ball and detent means, there will be a relative angular movement between input and output equal to one-half the clearance between the studs 26 and their mating slots 28. At this point the input and output again rotate in unison, the imposed torque now being transmitted through the studs bearing against the ends of their mating slots. Thus the device of the present invention can continue to transmit torque even after the torque overload condition has been signalled.

When the parts of the device have assumed their signal giving positions shown in FIG. 4, it will be noted the balls 20 have axially shifted the switch plate 30 against the compressive action of the springs 34 and this axial shifting of the switch plate acts to shift a signal giving device such as a micro-switch 44, thereby when the overload condition has been reached, the switch or other signal sensing device is actuated to ring a bell, light a light, or otherwise indicate to the operator the overload condition.

If it is desired to also immediately stop transmitting power through the device rather than simply giving a signal of the overload conditions, the signal giving switch 44 can be connected to the power source for immediately terminating the power.

The overload sensing device provided by the present invention can thus be used to continue driving even though overload conditions are encountered or the power can be disrupted through the device. In either case, the action of the ball and detent arrangement is such that when the overload condition is reached, the balls are instantaneously removed with a rapid action from the detents without hunting or hesitation. For example, if an inclined ramp or other prior art detent and ball arrangements are used, the ball may ride up or down the ramps in a hesitating manner when overload conditions are present and without actually sending a signal. With the present invention, this hesitation, or cushioning or gentle and indecisive action of the overload system is eliminated.

The present ball and detent design is important in that when an overload condition occurs and the switch plate shifts axially, it is desirable that the ball and detent connection does not "hunt" or oscillate with small torque changes, which would thereby cause the switch to oscillate also creating switch problems. By using a relatively sharp-edged hole as the ball detent, and allowing the ball to seat relatively deep in the detent, a high torque transmitting capability is provided between the ball and detent for a given spring force. When an overload occurs, the detent contact point on the ball moves rapidly up toward the top of the ball, creating a very marked change in the angular force relationship between the ball and detent, greatly decreasing the torque transmitting capability of the ball and detent means. Thus, though a high torque is needed to unseat the ball, considerably lower applied torque is sufficient to hold the ball retracted and thus the switch plate extended. This trip-torque to hold-out torque relationship can be varied by spring rate of the springs used, by amount of angular movement permitted between input and output upon overload, and by ball to detent size relationship.

The present device is simple, positive in operation, low cost to manufacture, small in size in relation to its torque capacity, and can operate in either direction of rotation. The torque capacity can be varied easily by adjusting the spring pressure by means of the adjusting screws. The springs are externally mounted and can be changed without disassembling the clutch or drive members.

The spring means of the present invention act to not only resiliently load the switch plate but also act to apply the axial pressure directly through the switch plate and to the balls and their respective detents, thus transmitting full spring pressure to the balls for developing the necessary driving torque. Since the spring pressure is applied directly upon the balls, with no multiplication mechanism involved, the torque capacity to spring pressure ratio depends only on the tangential to axial force relationship created by the ball to detent design detail. Thus, for a given setting, the unit will repeat accurately and consistently within close torque tolerances.

This present device is versatile in its uses. For example, it has another important use beyond its ability to signal torque overloads. In most electric motor driven machinery, the start-up torque can easily exceed the running torque required, and when a conventional overload release clutch is used, the clutch must be sized to accommodate the start-up torque or it will disengage on start-up. Therefore, the running torque value cannot be used to size the clutch. With the present invention, the trip setting can be sized to suit the running or operational torque value as follows. During the initial start-up, the present device would ordinarily trip the switch, but by manually over-riding the switch momentarily, the device will continue to drive and start up the load. As soon as acceleration is completed, the device will reset automatically, the switch plate will retract and the drive is now protected against torques in excess of running torque levels.

I claim:

1. A torque overload sensing device comprising, a body secured to a rotatable member, a rotor mounted adjacent said body for driving rotation therewith; ball and detent means between said body and said rotor and including a plurality of axially shiftable balls mounted on said body, an axially alignable detent on said rotor for each of said balls, said detents being formed with a sharp corner adjacent said balls and for engagement therewith and which prevent said balls from bottoming in said detents, said balls being resiliently urged into said detents but forced therefrom by excessive torque on said device; stud means between said body and rotor and including studs rigidly fixed on said body and extending therefrom in both axial directions, circumferentially arcuate recesses in said rotor and into which said studs extend for limited relative rotation therein, said recesses having circumferential end portions engagable by their respective studs for providing a driving connection between said rotor and said body when said balls have been forced from their respective detents, switch plate means axially shiftable on said studs, and spring means carried by said studs and bearing against said switch plate for providing axial compressive force on said balls and urging said plate into contact with said balls and consequently urging said balls into their respective detents.

2. A torque overload sensing device comprising, a body having means for being secured to a rotatable shaft for rotation about an axis, a rotor mounted around said shaft and adjacent said body for rotation therewith; detachable drive means between said body and rotor and comprising, axially shiftable balls and an axially alignable detent for each ball, said balls being resiliently held in their respective detents, said detents being formed with a sharp corner adjacent said balls for engagement therewith and which prevent said balls from bottoming in said detents and which causes said balls to release instantaneously without delay from said detents with a snap action when excessive torque occurs, said balls and detents providing a driving connection between said body and rotor which is disengaged by excessive torque; a second driving connection between said body and rotor and comprising, studs between said body and rotor, and circumferentially arcuate recesses into which said studs extend for limited relative rotation therein, said recesses having circumferential end portions engagable by their respective studs for providing a driving connection between said rotor and said body when said balls have been urged from their respective detents by excessive torque, switch plate means axially shiftable on said studs, and spring means carried by said studs and held captive thereon and bearing against said switch plate for urging the latter into contact with said balls and consequently urging said balls into their respective detents, said springs thereby providing axial compressive force on said balls for urging said balls into their respective detents.

3. A torque overload sensing device comprising, a body having a central opening and means for securing a shaft therein for rotation of said body and said shaft as a unit, said body having a radially extending flange and also having an axially extending hub, a plurality of holes extending axially through said flange and circumferentially spaced around said body, a ball located in each of said holes and extending axially from each side of said flange, said ball being axially shiftable in said holes, a rotor mounted on said body hub and axially fixed thereon, said rotor having a transverse surface adjacent said body flange, said surface having a plurality of circular detents formed therein and opening toward said body flange, said detents defining a sharp corner with said surface, said balls seatable in said detents and against said sharp surface, a switch plate located adjacent said body flange and on a side thereof opposite from said rotor, a plurality of stud means extending through said flange and fixed therein and extending outwardly from both sides of said flange, said rotor having a plurality of axially extending recesses therein, said recesses being circumferentially elongated to form arcuate slots, one end of said studs being located in said slots for forming a drivable connection with said rotor, said switch plate being mounted on said studs for axial movement thereon, said switch plate bearing against said balls, spring means carried by said other end of said studs and bearing against said switch plate to urge the latter against said balls and consequently urging said balls into said detents, whereby said springs provide axial compressive force on said balls and said balls and detents provide a releasable driving connection between said rotor and said body, and when an excessive torque is encountered by said device, said body rotates relative to said rotor to cause said stud ends to bear against an end of said arcuate slots to thereby form a driving connection between said body and said rotor when said balls are forced from their detents thereby said balls urging said switch plate in an axial direction on said studs and away from said body.

4. A torque overload sensing device comprising, a body having a central opening and means for securing a shaft therein for rotation of said body and said shaft as a unit, said body having a radially extending flange including axially spaced apart transversely extending sides, said body also having an axially extending hub, a plurality of holes extending axially through and circumferentially spaced around said flange, a ball located and axially shiftable in each of said holes and extending axially from each of said sides of said flange a rotor mounted on said body hub and axially fixed thereon, said rotor having a transverse surface adjacent said body flange, said surface having a plurality of circular detents formed therein and opening toward said body flange, said detents defining a sharp corner with said surface, said balls seatable in said detents and against said sharp surface, a switch plate located adjacent said body flange and on a side thereof axially opposite from said rotor, a plurality of stud means extending through said flange and fixed therein and extending outwardly from both sides of said flange, said rotor having a plurality of axially extending and circumferentially elongated recesses therein and forming arcuate slots, said slots having opposite ends, one end of said studs being located in said slots for forming a drivable connection with said rotor, said switch plate being mounted on said studs for axial movement thereon, said switch plate bearing against said balls, spring means carried by said other end of said studs and bearing against said switch plate to urge the latter against said balls and said balls into said detents, whereby said springs provide axial compressive force on said balls and said balls and detents provide a releasable driving connection between said rotor and said body, and when an excessive torque is encountered by said device, said body rotates relative to said rotor to (1) force said balls out of said detents with a snap action, (2) cause said stud ends to bear against one of said ends of said arcuate slots to thereby form a driving connection between said body and said rotor, and (3) said balls urge said switch plate in an axial direction on said studs and away from said body to actuate a sensing device.

* * * * *